United States Patent
Waterbury et al.

(10) Patent No.: US 6,828,018 B2
(45) Date of Patent: Dec. 7, 2004

(54) WATER DISSOLVABLE TAPE

(75) Inventors: Mark C. Waterbury, Bowling Green, OH (US); Jeffrey Palmer, Bowling Green, OH (US)

(73) Assignee: CMC Daymark Corporation, Bowling Green, OH (US)

( * ) Notice: Subject to any disclaimer, the term of this patent is extended or adjusted under 35 U.S.C. 154(b) by 0 days.

(21) Appl. No.: 10/008,911

(22) Filed: Dec. 6, 2001

(65) Prior Publication Data

US 2002/0182403 A1 Dec. 5, 2002

Related U.S. Application Data

(60) Provisional application No. 60/294,071, filed on May 29, 2001.

(51) Int. Cl.[7] .............................. B32B 7/12; C09J 7/02
(52) U.S. Cl. ....................... 428/354; 428/352; 428/353; 428/355 R; 428/355 AC; 428/906; 536/107
(58) Field of Search ................................ 428/906, 354, 428/352, 353, 355 AC, 355 R; 536/107, 110

(56) References Cited

U.S. PATENT DOCUMENTS

| | | | |
|---|---|---|---|
| 4,331,576 A | | 5/1982 | Colon et al. |
| 4,444,839 A | | 4/1984 | Dudzik et al. |
| 4,716,194 A | | 12/1987 | Walker et al. |
| 4,917,926 A | | 4/1990 | Weinhold et al. |
| 5,284,690 A | | 2/1994 | Williams et al. |
| 5,318,815 A | | 6/1994 | Newing et al. |
| 5,332,607 A | * | 7/1994 | Nakamura et al. ............ 428/40 |
| 5,413,815 A | | 5/1995 | Williams et al. |
| 5,464,692 A | * | 11/1995 | Huber ........................ 428/343 |
| 5,548,017 A | | 8/1996 | DiStefano |
| 5,624,751 A | * | 4/1997 | Spies et al. ........... 428/355 AC |
| 5,641,567 A | * | 6/1997 | Brown et al. ................ 428/327 |
| 6,001,473 A | | 12/1999 | Atkinson et al. |
| 2002/0182403 A1 | * | 12/2002 | Waterbury et al. .......... 428/343 |

* cited by examiner

*Primary Examiner*—Daniel Zirker

(57) ABSTRACT

This article is a self-wound, water dissolvable tape. The tape is substantially removable with water, and may be wound onto a spool without an interleaving layer of release coated material. The tape comprises a water dissolvable, continuous phase substrate having a first surface and a second surface, a water dissovable, continuous phase adhesive layer on the first surface of the substrate, and a water dissolvable, continuous phase abherent layer on the second surface of the substrate.

1 Claim, 2 Drawing Sheets

WATER DISSOLVABLE TAPE

This Application claims benefit of 60/294,071 filed on May 29, 2001.

TECHNICAL FIELD

This invention relates to self wound, water dissolvable, adhesive tape. More specifically, the tapes are dissolvable tapes, labels, and other adhesive markers with applications including, but not limited to, date marking labels, masking tapes, adhesive markers. The tapes are used in manufacturing, and other applications requiring an easily removable, pressure sensitive adhesive label or tape.

BACKGROUND OF THE INVENTION

Food date marking labels are of vital importance to ensuring freshness in the food services industry. Properly and clearly marking food containers to ensure that freshness dates are not exceeded is essential to prevention of food poisoning and other contamination borne health problems. After use, however, these labels must be removed from reusable containers before subsequent refilling of said containers to guarantee cleanliness and removed from reusable containers before subsequent refilling of the containers to guarantee cleanliness and avoid contamination by bacterial or other matter. Removal of conventional labels or tape is difficult and imperfect because residual adhesive and label or tape substrate material tends to be left behind. For this reason, water "dissolvable" labels have come into widespread use in the food services and other industries.

In the food marking industry, the term "water dissolvable" means that marking labels are readily and fully removed with agitated water, even though said labels may not be completely soluble in the chemical sense of that term, which would involve complete separation into chemical species (atoms or molecules). In this process, labels separate into cellulose fibers, adhesives, and other materials that comprise them, into a fine enough form that they may be carried away by the water. Dissolution is achieved because each component of the labels contain a sufficient quantity, and an appropriate distribution of water dissolvable material such that the entire body of the label substrate, any coatings or indicia on the label, and the pressure sensitive adhesive layer, are all readily washed away and cleanly removed by immersion in water with agitation. Similarly, water dissolvable adhesive tapes are available that can be used for marking or to adhere other materials.

These tapes, however, currently require the use of costly backing material which is typically coated with a silicone or other abherent (resistant to adhesion) material to allow for easy release of the pressure sensitive adhesive. The labels or tape are interleaved with this backing material on a roll for transportation, storage, and sale. Without this backing material, the pressure sensitive adhesive would bind to the top layer of the label or tape and impede or destroy the ability to unwind and utilize the label or tape. This would result because of the combination of time and temperature, along with pressure between each layer of adhesive tape. The time, temperature and pressure would result in admixture and adhesion of said adhesive to the top surface of said previous layer. The resulting requirement for an expensive abherent coated interleaving material, which is wastefully discarded subsequent to the removal of the labels or tape, adds a significant cost to water dissolvable marking labels and tapes and impedes their application.

Although a dissolvable tape is disclosed in U.S. Pat. No. 4,971,926, the tape described therein requires a fluorocarbon solvent. This presents serious environmental difficulties, in contrast with the water dissolution of the present invention. In addition, the patent describes a tape in which a protective layer of polyethylene terephthalate (P.E.T.) is utilized. The tape is silicone coated as an interleaving area, adding considerable expense. This high cost and the environmental issues severely limit the use of the prior art tape in areas outside electronic circuit board manufacture.

Still other tapes require an expensive and distinct abherent coated backing material, which is wastefully discarded subsequent to removal of the labels or tape, adds a significant cost to water dissolvable and tapes and impedes their application. It can be seen that the transfer of even a small amount of pressure sensitive adhesive from the bottom surface of a tape to the top surface of the subsequent layer would leave the tape with an unacceptable appearance and unsanitary, gummy top surface.

SUMMARY OF THE INVENTION

The present invention addresses the need for a low cost, water dissolvable adhesive tape by enabling such tape to be "self-wound," that is, to be directly wound onto itself on a spool without the inclusion of an intervening layer of release material between each layer of labels or tape.

This invention is a family of adhesive tape structures and formulations that are comprised entirely of materials that are dissolvable by water, and which can be "self wound" that is, wound directly onto the previous layer of tape on a roll. This is achieved through the use of combinations of adhesive layer formulations and release layer formulations that are mutually abherent, that is, not susceptible to the formation of adhesive bonding, thereby allowing the easy unwinding of the tape for use. In addition, a family of compositions and microstructures are disclosed which achieve the necessary dissolution of each tape constituent in aqueous media.

The structure is a self-wound, water dissolvable, adhesive tape. The article comprises a plurality of microstructures of pressure sensitive adhesives that include a continuous, water dissolvable first phase material and a discontinuous, water dissolvable second phase material. The plurality of compositions of pressure sensitive adhesives for making the article include at least one organic compound incorporating one or more highly polarity functional groups. The polar functional groups include an acid functionality, an alcohol functionality, a ketone functionality, an aldehyde functionality or an ester linkage. In another embodiment, the plurality of compositions are release coatings for making the article. The release coatings include an organic compound incorporating one or more high polarity functional groups.

DETAILED DESCRIPTION OF THE INVENTION

Figure 1:
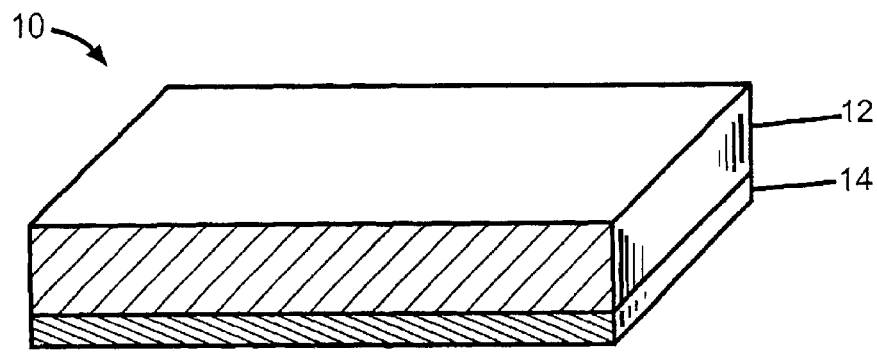
FIG. 1 shows a water dissolvable, self-wound adhesive tape structure comprising dissolvable, single phase materials in the substrate and in the adhesive layers.

The term, "dissolve" and its related forms, "dissolvable," and "dissolved," and "dissolution," in the context of this patent is defined to refer to a separation of a material into small components under the influence of a solvent medium, and not to a complete separation into separate molecules or atoms. For example, a paper material is said to be dissolved if it breaks down into separated cellulose fibers, even though those fibers themselves are not separated into their constituent cellulose and lignin molecules. Similarly, an adhesive layer can be dissolved and effectively removed if it is separated into aggregations of molecules. Similarly, an adhesive can be dissolved and effectively removed if it is separated into aggregations of molecules that are each capable of water removal, particularly if they are encased in a layer with a hydrophilic nature to facilitate their suspension into a latex, colloid, or micellar form.

To achieve dissolution of the entire tape, comprising, in general, a release layer, a substrate layer, and an adhesive layer, each said layer, individually and collectively, must be susceptible of dissolution in water within a convenient frame of time, as determined by the use requirements and typically in the range of 30 seconds.

The dependence of material properties on phase distributions between continuous and non-continuous phases is well established in the materials science literature, particularly in metallurgy. As one portion of the present invention, this dependence is exploited to generate a material property for the whole, water solubility, that may not be present in each constituent of that whole.

For the layer materials to be dissolvable by water, at least one of two criteria must be met. In one, simple case, the entire, single phase body of said material may be dissolvable by water, leading to its direct removal. In the second case, the body may consist of regions that comprise, at least, a non-continuous phase, which may, or may not be water dissolvable, entirely separated by another phase region or set of regions which are water dissolvable. By designing the microstructure of said material to consist entirely of either water dissolvable component, or non-water dissolvable components that are separated by water dissolvable components, the material as a whole may be seen to be water dissolvable, in the sense that it will be separated into small, removable, constituent portions. The presence of additional constituent phases may be tolerated without loss of dissolvability provided that they are either discontinuous, as in said non-continuous phases or are themselves dissolvable.

It is possible to design a microstructure which is theoretically dissolvable, but which is sufficiently resistant to dissolution that as a practical matter it fails to dissolve. This may be achieved by incorporating a water insoluble discontinuous phase that has a high aspect ratio, that is, the ratio of its dimensions is very high, giving it a fiber-like or plate-like morphology. Such fibers or plates may have the effect of locking up the structure by providing internal mechanical constraint to deformation, and may additionally limit the transport of water into the water dissolvable phase or phases, even though they are contiguous. Such microstructures must be avoided if the desirable properties of the present invention are to be achieved.

Release materials are typically comprised of silicones, such as organosiloxanes, polyolefins, fluorocarbons, waxes, fatty ester waxes, fatty acids, and animal-derived waxy compounds. Of these, all but the fatty acids are relatively non-dissolvable in aqueous media. A new class of release material, starch esters, is disclosed in U.S. Pat. No. 6,001,473, however, which can be dissolved by water. Such a water dissolvable release material may be desirably used in the present invention.

For a tape to be self-wound, the adhesive layer must display greater adhesive to the tape substrate than it does to the release layer on the previous layer of tape substrate. Furthermore, said adhesive layer must not be contaminated by said release layer, nor must it leave adhesive behind on said release layer when it is unwound for use.

The tape described in the present invention usually comprises three layers. The top, "release layer" consists of a material or materials that are coated on top of the substrate layer and which provide a low adhesion to the third layer, the "adhesive layer" of the subsequent winding of tape. The middle layer, called the "substrate" consists of a film, paper, or other material that possesses sufficient mechanical strength to retain the other layers, to be wound onto and removed from a tape roll, and to be affixed to surfaces for use. In cases where the adhesion between said adhesive layer and the substrate layer is sufficiently greater than the adhesion between the adhesive layer, sometime after it has been applied, and the substrate layer, it may be possible to omit the release layer and directly self-wind a tape consisting of only two layers, the substrate and the adhesive layers.

Turning now to the drawings, FIG. 1 shows water dissolvable tape 10. Tape 10 includes substrate 12 and adhesive layer 14. Both substrate 12 and adhesive layer 14 are water dissolvable, single phase materials.

Figure 2:
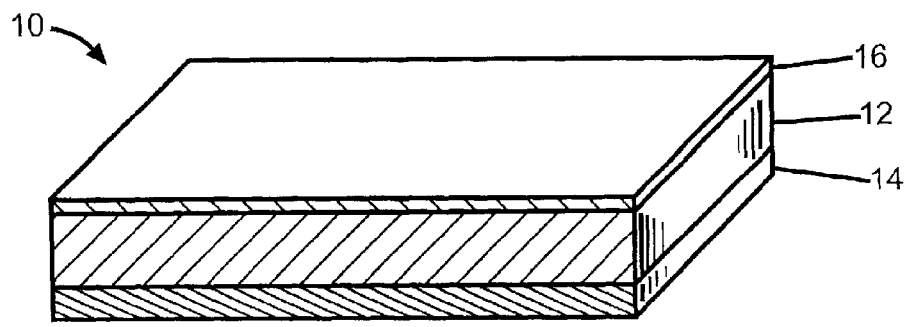
FIG. 2 shows a water dissolvable, self-wound adhesive tape structure comprising a dissolvable, single phase, abherent coating layer, a dissolvable, single phase substrate layer, and a dissolvable, single phase pressure sensitive adhesive layer.

FIG. 2 shows tape 10 of FIG. 1 also including water dissolvable, single phase, abherent coating layer 16.

Figure 3:
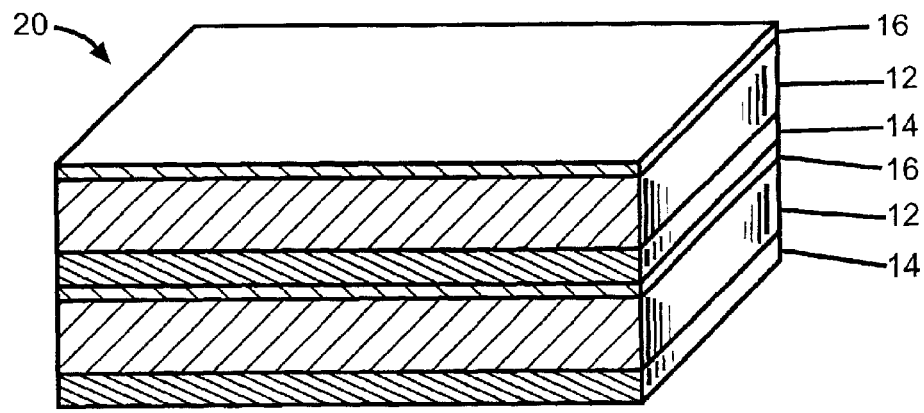
FIG. 3 shows two layers on a roll of dissolvable, self-wound adhesive tape structure comprising two layers of the tape of FIG. 2.

FIG. 3 shows two layers of tape 10 according to FIG. 2 on roll 20 of dissolvable, self-wound tape.

Figure 4:
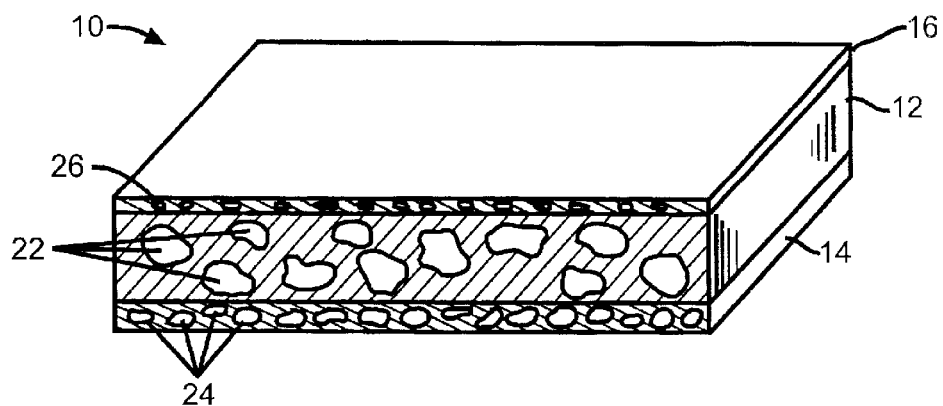
FIG. 4 shows the water dissolvable, self-wound adhesive tape structure of FIG. 2 wherein each layer includes a second, non-dissolvable, discontinuous phase.

FIG. 4 shows tape 10 of FIG. 2 with non-dissolvable, discontinuous phases 22, 24 and 26, respectively.

Figure 5:
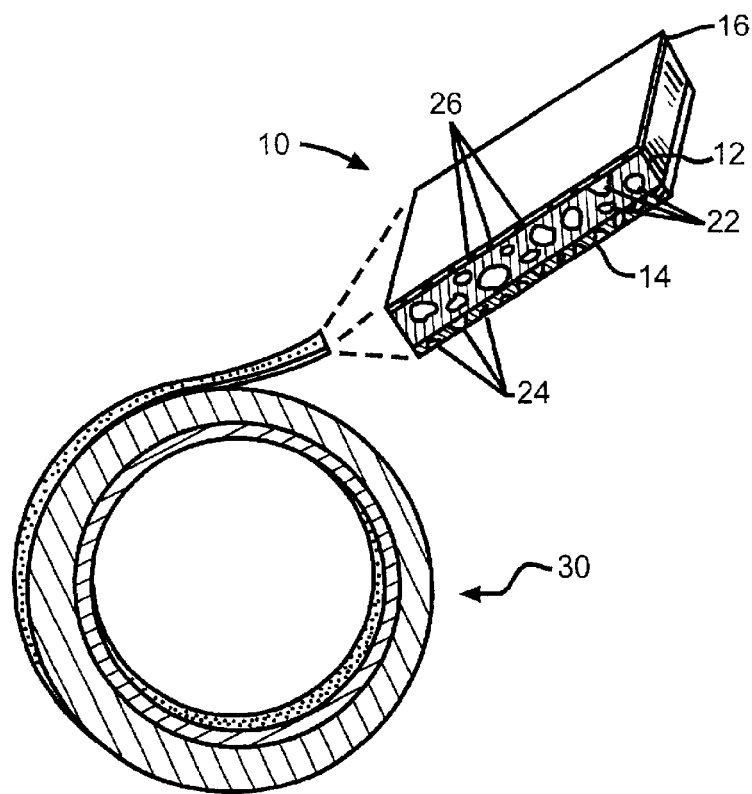
FIG. 5 shows a roll of water dissolvable, self-wound tape of the tape of FIG. 4.

FIG. 5 shows roll 30 of tape 10 of FIG. 4.

In some cases, a layer to promote adhesion between the substrate layer and the adhesive layer may be desirable, in which case a structure comprised of at least three layers, and preferably four layers, is required. This structure comprises a substrate layer, primer layer, and adhesive layer, or, preferably, an abherent layer, a substrate layer, a primer layer, and an adhesive layer.

Even in the case of such a 4 layered structure, considerable cost savings accrue to the present invention compared with the cost of dissolvable tape structures requiring a distinct release substrate.

Specific examples of materials classes are as follows.

The water dissolvable, continuous phase adhesives include at least one organic compound incorporating one or more highly polarity functional groups. The polar functional groups include an acid functionality, an alcohol functionality, a ketone functionality, an aldehyde functionality or an ester linkage.

The acids are polymers containing an acid functionality. They include carboxylic acid, for example, such as those constructed with acrylic acid, methacrylic acid, citraconic, and fumaric acid.

The alcohol are materials such as polyvinyl alcohol.

The ketones include a ketone group that confers water solubility to materials such as vinyl pyrrolidone polymer.

The aldehydes are very similar chemically to ketones, with the doubly bonded oxygen situated at the end of a chain, rather than in the chain. An aldehyde functionality situated on a side chain would enhance solubility of any polymer in aqueous media.

The esters have ester functionality such as for instance polyvinyl acetate.

The water dissolvable, continuous phase abherent layer comprises lecithin. Phospholipids such as Lecithin, are a mixture of biologically derived compounds, primarily phospholipids. The phosphate functionality of which provides a hydrophilic functional group.

Combinations of said hydrophilic functional groups are also commonly used to promote solubility of the complete molecule, as, for instance, polymers containing fatty acid esters and quarternary amines.

EXAMPLE

FIG. 4 shows a preferred embodiment with the following constituents. Abherent layer 16 is a water dissolvable, continuous phase comprised of lecithin with nondissolvable, discontinuous phase 26 comprising polymethyl siloxane. Substrate 12 is a water dissolvable, continuous phase comprising soluble starch and nondissolvable, discontinuous phase 22 comprises cellulose fibers. The soluble starch preferable is cationic corn starch. Adhesive layer 14 is a water dissolvable, continuous phase comprising an ionic salt of a polyacrylic acid and non-dissolvable, discontinuous phase 24 comprises a high molecular weight acrylic acid.

The continuous phase of the abherent layer preferably is lecithin. Lecithin is an organic compound having at least one fatty acid ester and at least one quaternary amine. They include diglycerides and triglycerides with a quaternary amine functional group replacing one of the fatty acid groups. Examples of these compounds include lecithin, hydroxylated lecithin and lecithin derivatives. Derivatives include phosphalidycholine and phosphatidylethanolamine, and the quaternary ammonium salt of tallow. Fatty hydroxylated, ethoxylated and propoxylated quaternary and diquarternary amines are also useful in the abherent layer. Some compounds are naturally occurring. For example, lecithin is a naturally occurring mixture of phospholipids having both a hydrophilic portion and a hydrophobic portion and is found in most living cells. The primary source of commercial lecithin comes from the soybean.

The discontinuous phase of the abherent layer preferably is polyethyl siloxane. This silicone portion also may be either a hydroxy- or alkoxy-functional polysiloxane.

The soluble starch may be those derived from any plant source including corn, potato, wheat, rice, sago, tapioca, waxy maize, sorghum, and high amylose starch, i.e., starch having at least 45% and more particularly at least 65% amylose content, such as high amylose corn. Starch flours may also be used. Also included are the conversion products derived from any of the former bases, such as dextrins prepared by hydrolytic action of acid and/or heat, fluidity or thin boiling starches prepared by enzyme conversion or mild acid hydrolysis, oxidized starches prepared by treatment with oxidants such as sodium hypochlorite, and derivatized starches such as cationic, anionic, amphoteric, non-ionic, and crosslinked.

The cellulose files generally are derived from wood pulp or from cotton linters. Wood pulps include chemical pulps, sulfite, and sulfate pulps, as well as mechanical pulps which include, groundwood, thermomechanical pulp, and chemically modified thermomechanical pulp. Also applicable are fibers derived from recycled paper. Of these fibers, chemically modified softwood is preferred. Mixtures of these cellulose fibers can be utilized.

Regarding the continuous phase of the adhesive layer, examples of the water-soluble polymers include polyacrylates, polyacrylamides, polyvinyl alcohol, cellulosic polymers and the like.

The water soluble component also may contain an acid functionality. The acid functionality may be incorporated in the polymer by incorporating acid-containing monomers into the polymer. Useful acid-containing monomers include those monomers having carboxylic acid functionality, such as for example acrylic acid, methacrylic acid, itaconic acid, fumaric acid, cirtraconic acid, phospoethyl methacrylate and the like.

The discontinuous phase refers to a water insoluble polymer. A wide variety of monomers or mixture of monomers can be used to make the insoluble polymer. For example, acrylic ester monomers, including methyl acrylate, ethyl acrylate, propyl acrylate, isopropyl acrylate, butyl acrylate, isobutyl acrylate, secondary butyl acrylate, and the like.

In addition, conventional components such as, for example, pigments, binders, vehicles, extenders, dispersants, surfactants, coalescents, wetting agents, rheology modifiers, thickeners, drying retarders, anti-foaming agents, colorants, waxes, preservatives, heat stablilizers, ultraviolet light absorbers and the like may be used.

In addition to these embodiments, persons skilled in the art can see that numerous modifications and changes may be made to the above invention without departing from the intended spirit and scope thereof.

We claim:

1. A roll of water dissolvable, self-wound tape comprising a first abherent layer comprising a first, water dissolvable, continuous phase and a second, non-dissolvable, discontinuous phase, a second substrate layer comprising a first, water dissolvable, continuous phase and a second, non-dissolvable, discontinuous phase, and a third layer comprising a water dissolvable pressure sensitive adhesive continuous phase and a second, non-dissolvable, discontinuous phase wound upon a core;

wherein the water dissolvable, continuous phase substrate has a first surface and a second surface, wherein the water dissolvable, continuous phase adhesive layer is on the first surface of the substrate, wherein the water dissolvable, continuous phase abherent layer is on the second surface of the substrate, and wherein the water dissolvable continuous phase of the abherent layer comprises lecithin, and the discontinuous, non-dissolvable, discontinuous phase comprises polymethyl siloxane;

wherein the water dissolvable continuous phase of the substrate layer comprises a soluble starch, and the discontinuous phase comprises cellulose fibers, wherein the water dissolvable, continuous phase adhesive layer comprises an ionic salt of poly-acrylic acid and the non-dissolvable, discontinuous phase comprises a nondissolvable, high molecular weight acrylic acid.

* * * * *